(No Model.)
L. J. BOSWORTH.
CHECK ROW CORN PLANTER.
No. 254,267. Patented Feb. 28, 1882.
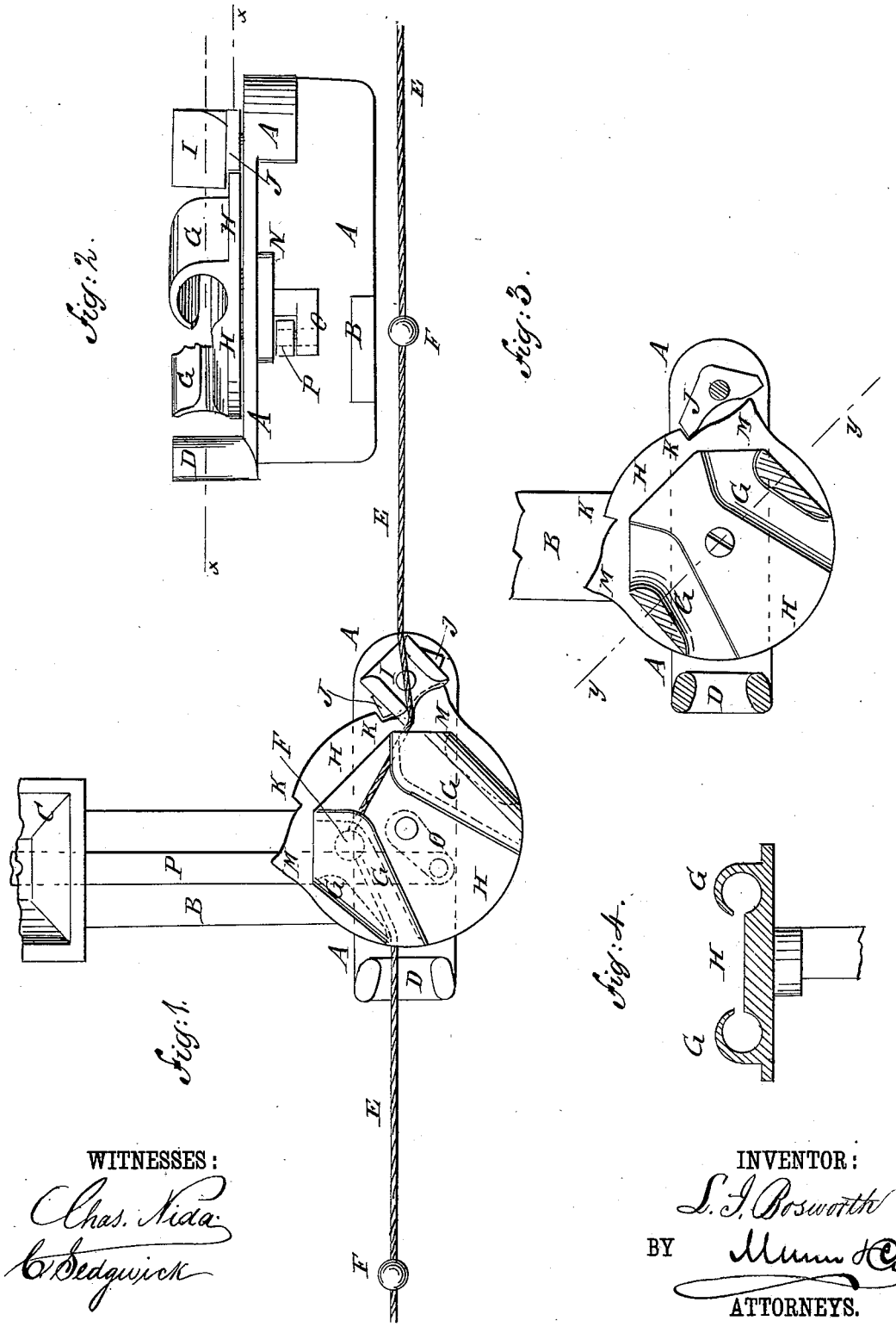
WITNESSES:
Chas. Nida
C. Sedgwick
INVENTOR:
L. J. Bosworth
BY Munn & Co.
ATTORNEYS.

UNITED STATES PATENT OFFICE.

LYCURGUS J. BOSWORTH, OF MONMOUTH, ILLINOIS, ASSIGNOR TO HIMSELF, ANTHONY CLIPPINGER, AND JAMES B. CLARK, OF SAME PLACE.

CHECK-ROW CORN-PLANTER.

SPECIFICATION forming part of Letters Patent No. 254,267, dated February 28, 1882.

Application filed September 24, 1881. (No model.)

*To all whom it may concern:*

Be it known that I, LYCURGUS J. BOSWORTH, of Monmouth, in the county of Warren and State of Illinois, have invented certain new and useful Improvements in Check-Row Corn-Planters, of which the following is a specification.

Reference is to be had to the accompanying drawings, forming part of this specification, in which similar letters of reference indicate corresponding parts in all the figures.

Figure 1 is a plan view of my improvement. Fig. 2 is a side elevation of the same. Fig. 3 is a sectional plan view of the same, taken through the line $x\ x$, Fig. 2. Fig. 4 is a sectional elevation of the oscillating wheel, taken through the line $y\ y$, Fig. 3.

The object of this invention is to simplify and cheapen the construction and promote accuracy in the operation of corn-planters of the class in which the seed-dropping mechanism is operated by a cord or wire extended across the field.

A represents an upright frame, which is attached to the board or cross-bar B, that carries the hoppers C, or to one of the said hoppers C.

To the forward end of the frame A is attached a forked guide, D, to bring the cord or wire E into proper position for the balls or knots F, attached to the said cord or wire E at suitable distances apart, to enter the guide-channels G, attached to or formed upon the wheel H. The guide-channels G are made of such a size that the balls or knots F will pass through them readily, and have slots in their inner sides that will allow the cord or wire E to pass through, but not the balls or knots F. The channels G are made with an outward bend near their rear ends, as shown in Fig. 3, and in dotted lines in Fig. 1, for the balls or knots F to draw against and turn the wheel H.

To the rear end of the frame A is pivoted a forked guide, I, the arms of which are made wide, so that the pressure of the cord or wire E may have a sufficient leverage to turn the said guide I.

To the base of the guide I, or to its pivot, is attached a double pawl, J, to engage with shoulders K formed upon the rim of the wheel H, to prevent the said wheel from rebounding out of position. The wheel H, when turned by the pressure of a ball or knot, F, against the outwardly-curved rear part of the channels G, is stopped with the rear end of a channel, G, opposite the opening of the guide I by inclined projections M, formed upon the rim of the wheel H at a little distance from the shoulders K, and which strike against an arm of the pawl J. The contact of the projection M and the arm of the pawl J brings the other end of the said pawl into position to engage with a shoulder, K, and thus prevent the wheel H from rebounding when its motion is checked. The channels G are so arranged upon the wheel H that when the rear end of either channel G is opposite the guide I the forward end of the other channel G will be opposite the forward guide, D.

The wheel H is pivoted to a bearing, N, attached to the frame A, and to the lower end of the said pivot is attached, or upon it is formed, a crank, O, to which is pivoted the seed-dropping slide P, or a rod connected with the said slide by a lever or other suitable means.

With this construction the reciprocating movement of the wheel H will operate the slide P to drop the seed.

Having thus fully described my invention, I claim as new and desire to secure by Letters Patent—

1. In a check-row planter, the wheel H, having the channels G G, bent at their rear ends and open at their inner sides, in combination with the rope or wire having balls at intervals, as and for the purpose described.

2. In a check-row corn-planter, the combination, with the wheel H, having shoulders K and inclined projections M, and the pivoted guide I, of the double pawl J, whereby the said wheel is held in place and prevented from rebounding, as set forth.

LYCURGUS JEDSON BOSWORTH.

Witnesses:
STEPHEN GIBSON,
ROBERT J. GRIER.